United States Patent [19]

Root

[11] 4,068,361
[45] Jan. 17, 1978

[54] SELF-JIGGING METHOD OF FABRICATING SOLAR COLLECTOR HEAT TRAP FROM FLEXIBLE PLASTIC ROLL MATERIAL

[75] Inventor: Ernest F. Root, Nashua, N.H.

[73] Assignee: Itek Corporation, Lexington, Mass.

[21] Appl. No.: 652,023

[22] Filed: Jan. 26, 1976

[51] Int. Cl.² .............................................. B23P 15/26
[52] U.S. Cl. ................................ 29/157.3 R; 126/271; 165/166
[58] Field of Search ................... 29/157.3 R, 157.3 C, 29/457; 126/271, 270; 165/166

[56] References Cited

U.S. PATENT DOCUMENTS

| 695,136 | 3/1902 | Baker | 126/271 |
|---|---|---|---|
| 1,932,950 | 10/1933 | Annis | 165/166 |
| 3,426,176 | 2/1969 | Simon | 165/166 |
| 3,841,738 | 10/1974 | Caplan | 126/271 |

FOREIGN PATENT DOCUMENTS

| 276,788 | 11/1965 | Australia | 126/270 |
|---|---|---|---|
| 922,129 | 5/1947 | France | 165/166 |
| 416,331 | 7/1925 | Germany | 165/166 |

Primary Examiner—C.W. Lanham
Assistant Examiner—Daniel C. Crane
Attorney, Agent, or Firm—Homer O. Blair; Robert L. Nathans; Gerald H. Glanzman

[57] ABSTRACT

A solar energy collector of low cost and high thermal efficiency is disclosed having a heat trap produced by zigzagging a thin strip of polyethylene terephthalate between opposite sides of the trap while wrapping the strip about rows of dowels positioned at opposite sides of the frame of the solar collector. A window of soda lime glass filters UV radiation to inhibit discoloration of the plastic heat trap walls. An absorber plate having fluid pipes therein is positioned underneath the heat trap and a first layer of fiberglass, and a second layer of polyurethane foam are positioned below the absorber plate. The fiberglass layer prevents overheating of the polyurethane foam layer to in turn inhibit the formation of toxic fluids, which may condense upon the underside of the window to reduce the efficiency of the collector.

8 Claims, 3 Drawing Figures

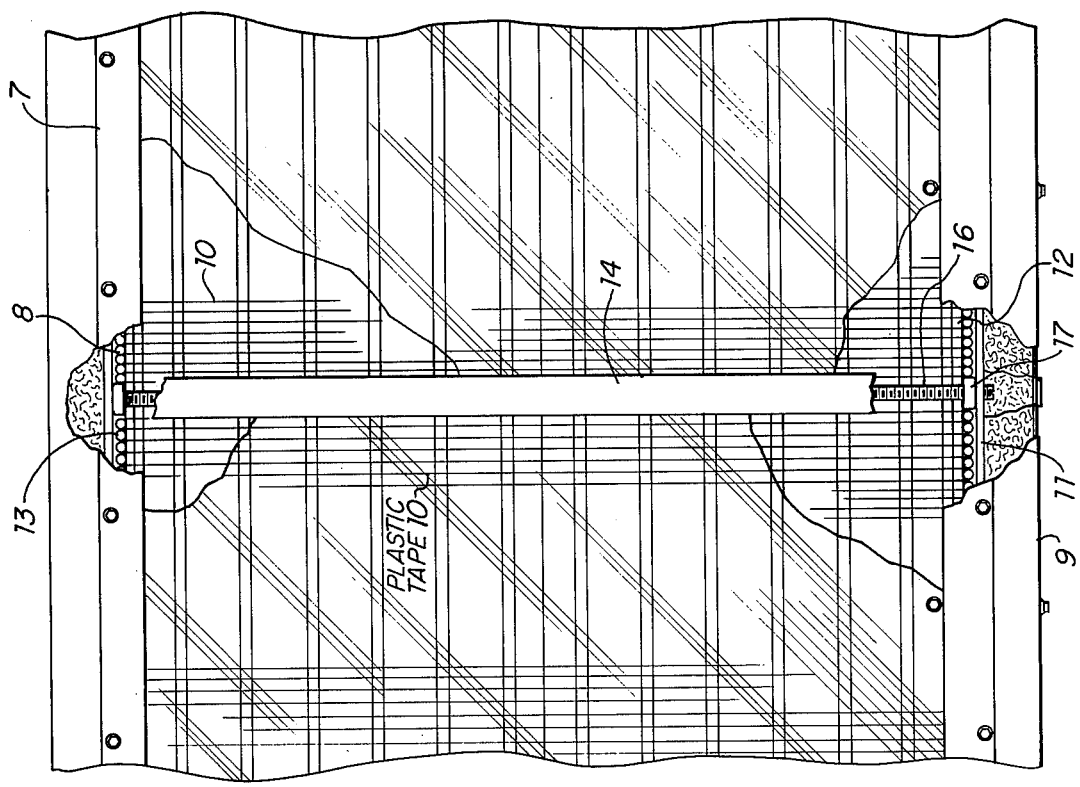
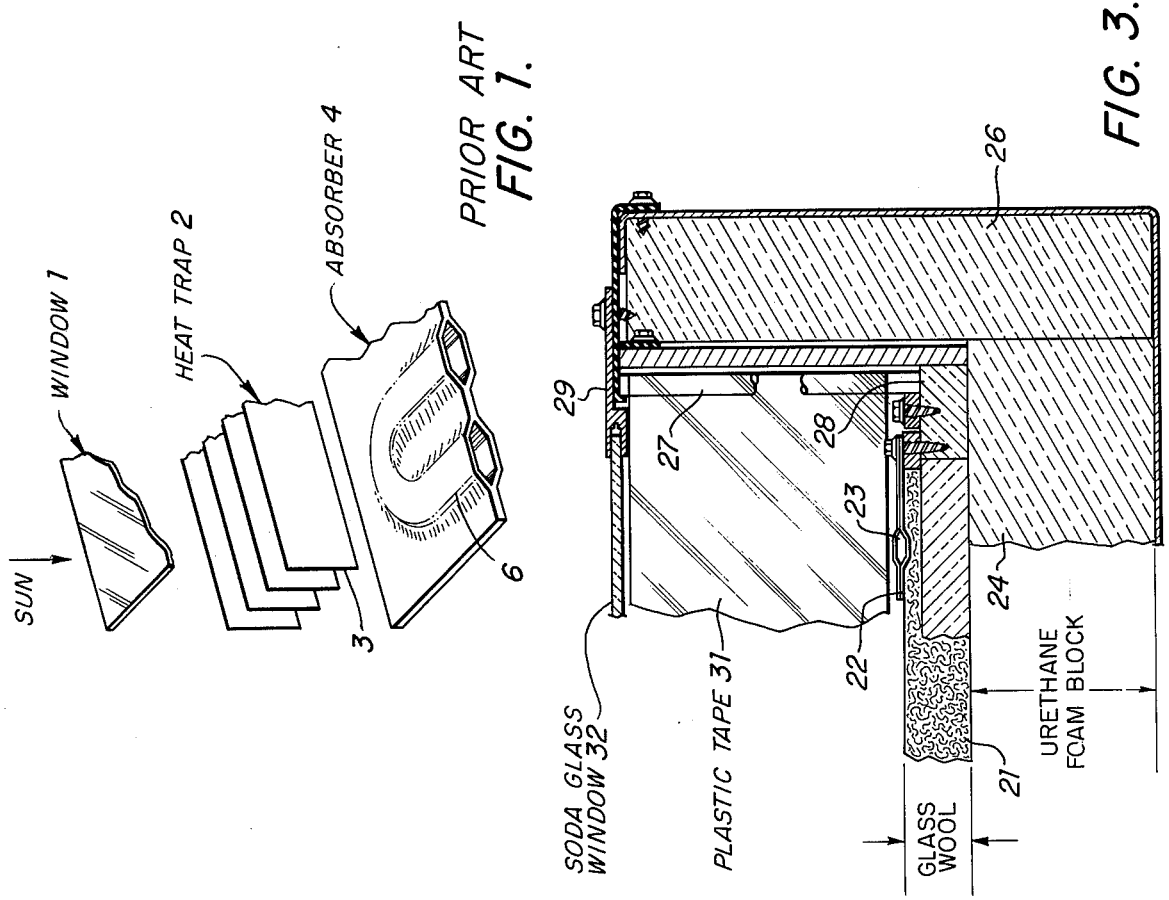

SELF-JIGGING METHOD OF FABRICATING SOLAR COLLECTOR HEAT TRAP FROM FLEXIBLE PLASTIC ROLL MATERIAL

BACKGROUND OF THE INVENTION

Owing to the energy crisis, a great deal of research activity is being conducted throughout the world with respect to solar collectors for heating fluids for applications in the fields of water heating, space heating, and air conditioning, thereby to reduce the quantities of conventional fuel consumed. While numerous solar collectors may be found in the prior art, it is highly desirable to produce collectors which have very high thermal efficiencies and yet which are relatively inexpensive to fabricate. The use of inexpensive materials and employment of labor saving techniques is thus of paramount importance in facilitating widespread use of the collectors.

SUMMARY OF THE INVENTION

In accordance with a preferred method of the present invention, a method of fabricating wall portions of the cells of a solar energy heat trap is carried out by winding a unitary strip of flexible wall material, preferably polyethylene terephthalate, about rows of dowels positioned at opposite sides of the frame of the solar collector. A roll of the flexible wall material is passed back and forth between operators standing at opposite sides of the collector frame, and the wall material is wrapped about one of the dowels associated with one side of the frame and is passed back to the other operator who wraps the wall material about another dowel associated with the opposite side of the frame. Just after the wrapping step, the operator inserts the dowel into a receptor channel positioned along the side of the frame, and thereafter passes the roll to the other operator, and as a result, elongated heat trap cells are produced by zigzagging the material across the collector about the dowels. Optionally, an adjustable compression member is positioned across the collector to push the dowel receptor channels away from each other to maintain tension in the flexible wall material after a given section of the heat trap has been fabricated, thereby to prevent wall sagging and the resulting loss in transmittance of the solar energy through the heat trap.

Other objects, features, and advantages of the present invention will become apparent upon the perusal of the following Detailed Description taken in conjunction with the drawings in which:

FIG. 1 discloses a portion of a solar collector fabricated in accordance with the prior art;

FIG. 2 illustrates a plan view of the collector fabricated in accordance with the teachings of the present invention; and FIG. 3 discloses a side sectional view of the collector of the present invention.

DETAILED DESCRIPTION

In FIG. 1, a cover plate or window 1 is positioned above heat trap 2 which is formed of wall members 3 which make up the cells of the heat trap. Absorber 4 is positioned beneath the heat trap, and typically includes pipes 6 containing fluid which is pumped through the absorber and is heated by solar radiation which passes through the heat trap. The widths of the heat traps are typically ⅜ inches to inhibit radiative losses and the formation of convection currents to maintain the air in stagnant condition, thereby to reduce thermal loss.

In FIG. 2, a first side 7 of the collector frame includes a first receptor means or channel 8 (shown more clearly in FIG. 3), and a second side of the collector means 9 includes a second receptor means or channel 11 for receiving and supporting the heat trap wall support members. In heat traps fabricated in accordance with the teachings of the invention, the flexible wall material forming the walls of the cell are wrapped about rows of wall support members, which in the particular embodiment illustrated consist of wooden dowels. A first row of wooden dowels 12 on one side of the collector and a second row of wooden dowels 13 on the other side of the collector support the wall members 10 which make up the cells of the heat trap. These cells are built up by positioning one operator at one side of the collector frame and a second operator at the opposite side of the collector frame. A roll of plastic sheet material, preferably polyethylene terephthalate, marketed under the trademark "MYLAR," having a thickness of approximately 0.001 inches and a width of approximately 4 inches is passed back and forth across the heat trap by the operators. As each operator receives the roll of plastic, she wraps the plastic about a dowel held in her hand to produce a 180° turn and just after this wrapping step, tilts the dowel so that it may be inserted within the dowel receptor channel. She thereafter straightens the dowel so that it is vertically oriented within the channel and so that it cannot be pulled out of the channel by the creation of tension in the plastic sheet material. She then inserts a spacer dowel in a similar manner to provide proper spacing. In other words, every other dowel in each row of dowels functions as a spacer and does not support tape. The process is repeated as the plastic roll material is zigzagged back and forth across the collector. Upon the completion of a section of a heat trap, optionally, a square locking dowel may be inserted into the receptor channel and tension is induced within the plastic roll material preferably by means of a compression member 14, which is positioned between the wall support member receptors or channels, as illustrated in FIG. 2. Other tape locking means may, of course, be employed. Compression is induced by the relative rotation of threaded member 16 with respect to associated threaded members which could comprise nuts 17 and 18. The result of the above-described fabrication method is that a highly efficient heat trap is rapidly and inexpensively fabricated, the trap having walls which do not droop (to provide maximum solar transmission) owing to the tension which may be easily induced within the plastic sheet material, the material being readily available and relatively inexpensive. Obviously, other wall support members may be employed rather than elongated cylindrical members such as dowels, and other receptor means may be utilized other than the above-described channels. However, the above-described arrangement is greatly preferred since the elongated wall support members are automatically aligned in proper position without receptor holes, for example, or other individual mounting means. The method has the advantage of being self-jigging. It is preferable that the dowels actually contact one another. The elimination of individual receptor means for each wall support member reduces manufacturing costs, which is of prime importance with regard to the mass marketing of solar collectors.

The use of commercial grade polyurethane foam for insulating the lower portions of the solar collector is greatly preferred to reduce manufacturing costs. One drawback of this material is that it releases toxic fluids when the foam exceeds predetermined temperature levels to produce a safety hazard. Condensation of the fluid upon the underside of the window will also reduce solar energy transmission through the window. This problem has been overcome by the inventor by adding a layer of heat insulating material over the polyurethane foam layer and under the heat absorber. Such layer insulates the polyurethane foam which generally maintains the temperature of the foam below the predetermined temperature which causes the release of toxic fluids. The preferred material for the first layer is fiberglass which is employed along with polyurethane on the collectors sold in the marketplace. The preferred thickness dimensions are approximately 1 inch for the first layer and approximately 3 inches for the second layer.

In FIG. 3, the first layer of insulating material 21 is shown positioned beneath heat absorber 22 which contains a fluid passage 23. The second insulating layer 24 is positioned beneath first insulating layer 21 to insulate the absorber to prevent heat flow through the lower portions of the solar collector. This foam material is also positioned along the sides of the collector as is shown in FIG. 3 at 26. One of the above-mentioned dowels 27 is shown positioned within channel portions 28 and 29, to be maintained in position as shown. A wall portion of the above-mentioned solar cells 31 made of plastic roll material, is illustrated in position, wrapped about dowel 27.

It has been found that the use of a very thin flexible polyethylene terephthalate in roll form readily lends itself to the rapid production of the cells in accordance with the above-mentioned fabrication technique. Additionally, through experimentation, it has been found that this particular plastic material has exceptionally high solar transmittance and reflectance characteristics. However, one of the disadvantages of this material is that it discolors upon being exposed to sunlight which could result in reduced solar transmittance upon aging. Expressions of disbelief of the practicality of using this material have been voiced to the manufacturer of the disclosed collector. In order to eliminate this drawback, a window of soda lime glass 32 has been employed in order to filter out ultraviolet radiation which is believed to be the principal agent in causing such discoloration. After a six month exposure to the sun of the collector fabricated in accordance with the above-mentioned techniques, it has been observed that no discoloration has been produced.

Thermal efficiencies ranging between 51 and 66% have actually been obtained in rooftop mounted collectors fabricated in accordance with the present invention, and thus, it should be apparent that the teachings set forth above result in highly marketable, efficient, and inexpensive units. Efficiencies above 80% are believed obtainable by these collectors.

An additional feature of the above-described solar collector is the use of non-metallic components in the interior portions of the collector in order to reduce heat loss through conduction; for example, the dowels are preferably made of wood. The member 20 shown in FIG. 3 was made of masonite.

The term polyethylene terephthalate used herein is intended to cover other materials having the following characteristics:

The capability of withstanding temperatures of 300° F without significant deformation.
Minimum tensile strength to withstand a one pound force pulling on a 4 inch wide tape of a thickness of 0.001 inches (250 pounds per square inch).
The material should be optically clear.

While preferred embodiments of the invention have been described, the teachings of the invention will readily suggest many other embodiments to those skilled in the art.

What is claimed is:

1. A method of fabricating wall portions of the cells of a solar energy heat trap comprising:
   a. providing a frame having first receptor means associated with one side of said frame for receiving a first plurality of wall support members together with second receptor means associated with the opposite side of said frame for receiving a second plurality of wall support members;
   b. wrapping a continuous strip of thin, flexible light transmissive wall material about a first wall support member of said first plurality of wall support members and thereafter inserting said first wall support member into said first receptor means, thereafter wrapping said material about a wall support member of said second plurality of wall support members, thereafter inserting said wall support member of said second plurality of wall support members into said second receptor means, thereafter wrapping said material about a second wall support member of said first plurality of wall support members, thereafter inserting said second wall support member into said first receptor means, and so forth to produce zig-zagged wall portions of the cells of said solar energy heat trap;
   c. inducing tension within said flexible light transmissive wall material after each of the wrapping steps of paragraph (b), thereby to prevent drooping of said material.

2. The method of claim 1 wherein a roll of said thin flexible wall material is passed back and forth between one side of said frame and the opposite side of said frame as the wrapping of said continuous strip of flexible wall material is performed about said wall support members.

3. The method of claim 2 wherein said continuous strip of thin flexible wall material is wrapped in zigzag fashion about every other wall support member of said first and second plurality of wall members in order that half of said wall support members function as spacer elements.

4. The method of claim 3 wherein each wall support member is turned into an upright position within said receptor means upon insertion therein.

5. The method of claim 2 wherein each wall support member is turned into an upright position within said receptor means upon insertion therein.

6. The method of claim 1 wherein said continuous strip of thin flexible wall material is wrapped in zigzag fashion about every other wall support member of said first and second plurality of wall members in order that half of said wall support members function as spacer elements.

7. The method of claim 6 wherein each wall support member is turned into an upright position within said receptor means upon insertion therein.

8. The method of claim 1 wherein each wall support member is turned into an upright position within said receptor means upon insertion therein.

* * * * *